United States Patent [19]

Kiuchi et al.

[11] 4,209,683
[45] Jun. 24, 1980

[54] LOAD RESPONSIVE TRIGGER INTERVAL CONTROL FOR INDUCTION HEATING APPARATUS HAVING INVERSELY PARALLEL CONNECTED THYRISTORS

[75] Inventors: Mitsuyuki Kiuchi; Hirokazu Yoshida; Shigeo Hamaoka; Hitoshi Wakita, all of Kadoma, Japan

[73] Assignee: Matsushita Electric Industrial Company, Limited, Kadoma, Japan

[21] Appl. No.: 943,792

[22] Filed: Sep. 19, 1978

[30] Foreign Application Priority Data

Sep. 20, 1977 [JP] Japan .............................. 52-113503

[51] Int. Cl.² ............................................ H05B 25/04
[52] U.S. Cl. ......................... 219/10.77; 219/10.49 R; 363/135; 363/96; 307/252 M; 307/252 T
[58] Field of Search ............... 219/10.77, 10.49, 10.75; 363/135, 96; 323/24, 18; 307/252 M, 252 T

[56] References Cited

U.S. PATENT DOCUMENTS

| | | | |
|---|---|---|---|
| 3,820,005 | 6/1974 | Steigerwald ................. | 219/10.77 X |
| 3,821,509 | 6/1974 | Amagami et al. ............ | 219/10.49 X |
| 4,074,101 | 2/1978 | Kiuchi et al. ................. | 219/10.49 R |
| 4,145,592 | 3/1979 | Mizukawa et al. ........... | 219/10.77X |

Primary Examiner—B. A. Reynolds
Assistant Examiner—Philip H. Leung
Attorney, Agent, or Firm—Lowe, King, Price & Becker

[57] ABSTRACT

An induction heating apparatus of the invention is provided with a pair of inversely parallel connected thyristors which receives power from a low frequency energy source. Depending on the polarity of the source voltage, one of the thyristors is triggered into conduction by a control pulse generated in delayed response to a sensed forward bias potential at its anode for the purpose of supplying a forward current to a commutating circuit which is tuned to a high frequency in the ultrasonic range, whereupon a backward current is generated. The backward current is commutated through the other thyristor to complete a high frequency oscillation. A detector is provided to detect when the magnitude of the backward commutating current reaches a predetermined value for the purpose of terminating the trigger control pulse. The control pulses are supplied simultaneously to both thyristors through a pulse transformer which upon termination of the control pulse generates a counterelectromotive force which negatively biases the thyristor which has been conducting during the first half-cycle of each complete oscillation to reduce its turn-off time.

6 Claims, 6 Drawing Figures

LOAD RESPONSIVE TRIGGER INTERVAL CONTROL FOR INDUCTION HEATING APPARATUS HAVING INVERSELY PARALLEL CONNECTED THYRISTORS

BACKGROUND OF THE INVENTION

The present invention relates generally to induction heating and in particular to an induction heating apparatus of the type in which the duration of forward current trigger is varied in accordance with varying loads to assure commutation of backward current.

Induction heating for houshold and industrial applications is found to be attractive because of its capability to transfer energy at high effeiciency as compared with resistance heating. However, cooking operation involves the use of utensils of various sizes, which results in undesirable consequences of a failure in trigger operations since the switching devices employed are not given sufficient time to turn off prior to the subsequent trigger instant. The induction heating apparatus which have hitherto been proposed employ constant duration trigger or gating control pulses to trigger the switching devices to generate a forward current in a commutating circuit which in response thereto generates a backward commutating current. Since the backward current flows in opposite phase relation with the polarity of the input power source, the commutation of such current in the second half-cycle of each oscillation represents a negative power, which offers an advantage in that a certain amount of power is returned to the input side of the apparatus. Therefore, it is important to assure that commutation should occur at all times. However, when load changes occur during operation the period of each forward and backward current tends to vary so that the conventional constant duration gating control approach fails to assure commutation with the attendant loss of recoverable energy.

SUMMARY OF THE INVENTION

The primary object of the invention is therefore to provide an improved induction heating apparatus which achieves power savings by recovering the otherwise wasted energy by assuring commutation of current even though load changes are encountered.

In accordance with the present invention, the induction heating apparatus comprises a pair of inversely parallel connected thyristors to which gating control pulses of same duration are applied simultaneously through a pulse transformer. Depending on the polarity of an input power source to which the thyristors are connected, one of the thyristors is rendered conductive to generate a forward current which is allowed to pass through a high frequency commutation circuit which in turn produces a backward current. The backward current is allowed to pass through the other thyristor to complete a high frequency oscillation. The gating control pulse is so generated in response to an output from a delay circuit that when the potential at the anode of the thryristor to be triggered in the first half-cycle of oscillation reaches a level sufficient to cause it to conduct. A detector is provided to detect when the magnitude of the backward current reaches a predererimned value for the purpose of terminating the control pulses.

The period of the control pulses is thus adjusted automatically in response to a load change so that the other thyristor is given sufficient interval to allow commutation of the backward current. The use of the pulse transformer offers a further advantage in that upon the termination of the gating control pulse there is produced in the secondary windings of the transformer a counter-electromotive force which negatively biases the thyristor through which the forward current has passed. This serves to reduce the turn-off time of the forwardly biased thyristor, which in turn permits the system to raise its upper frequency limit.

BRIEF DESCRIPTION OF THE DRAWINGS

The invention will be further described by way of example with reference to the accompanying drawings, in which.

DETAILED DESCRIPTION

Figure 1:
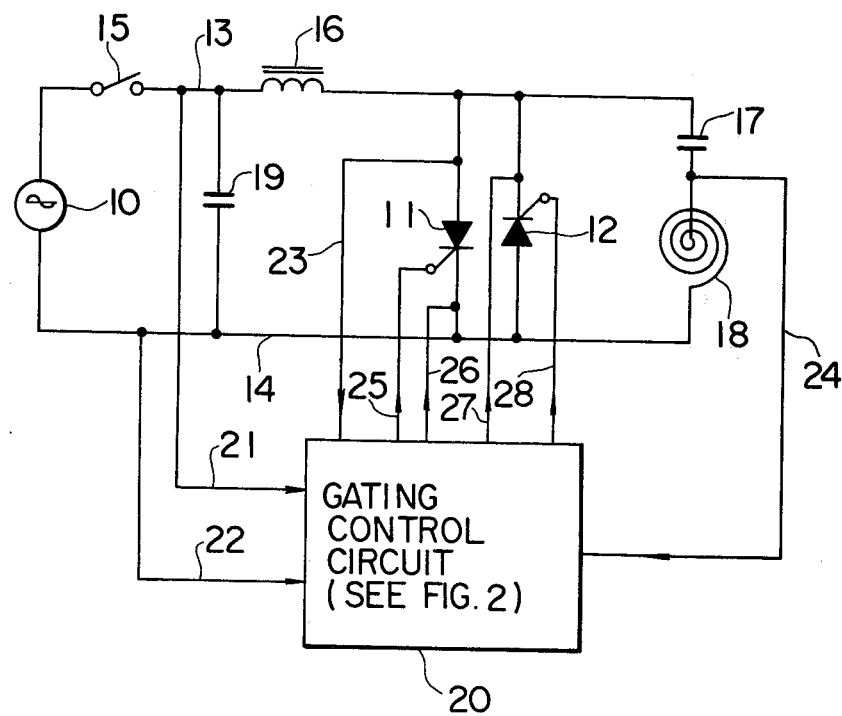
FIG. 1 is a general block diagram of the induction heating apparatus of the invention.

The induction heating cooking apparatus of the invention as represented in FIG. 1 comprises in a preferred embodiment a pair of inversely parallel connected semiconductor switching devices such as thyristors 11 and 12 which receive low frequency energy from an alternating voltage source 10 through a power line 13 including a power input switch 15 and a filter inductor 16 in series, and a power line 14. As will be described hereinbelow the thyristors 11 and 12 are alternately brought into conduction in response to gating control pulses supplied from the gating control circuit 20 depending on the polarity of the power source. In response to conduction of any one of the thyristors, a forward halfwave oscillating current flow is produced in a commutating circuit comprised of a series-connected capacitor 17 and an induction heating work coil 18 which is adapted to inductively couple with an inductive utensil. The commutating circuit is so designed that it produces a backward commutating current pulse in the next half-cycle which finds its passage through the other thyristor, thus completing a cycle of high frequency oscillation in the ultrasonic frequency range. The capacitor 19 connected across the power lines 13 and 14 is for the purpose of bypassing the high frequency oscillation to avoid undesirable consequences of radio frequency interference.

In accordance with the invention the thyristors 11 and 12 are supplied simultaneously with control pulses of equal duration which varies as a function of the magnitude of inductive utensil load through leads 25, 26, 27 and 28. To accomplish this gating control as well as to ensure safe operation of the apparatus, the gating control circuit 20 receives input signals from various points of the inverter circuit over conductors 21 and 22 to detect the polarity of the input power source, over conductor 23 to detect the voltage at the anode of thyristor 11 and over conductor 24 through which the voltage across the work coil 18 is sensed.

Figure 2:
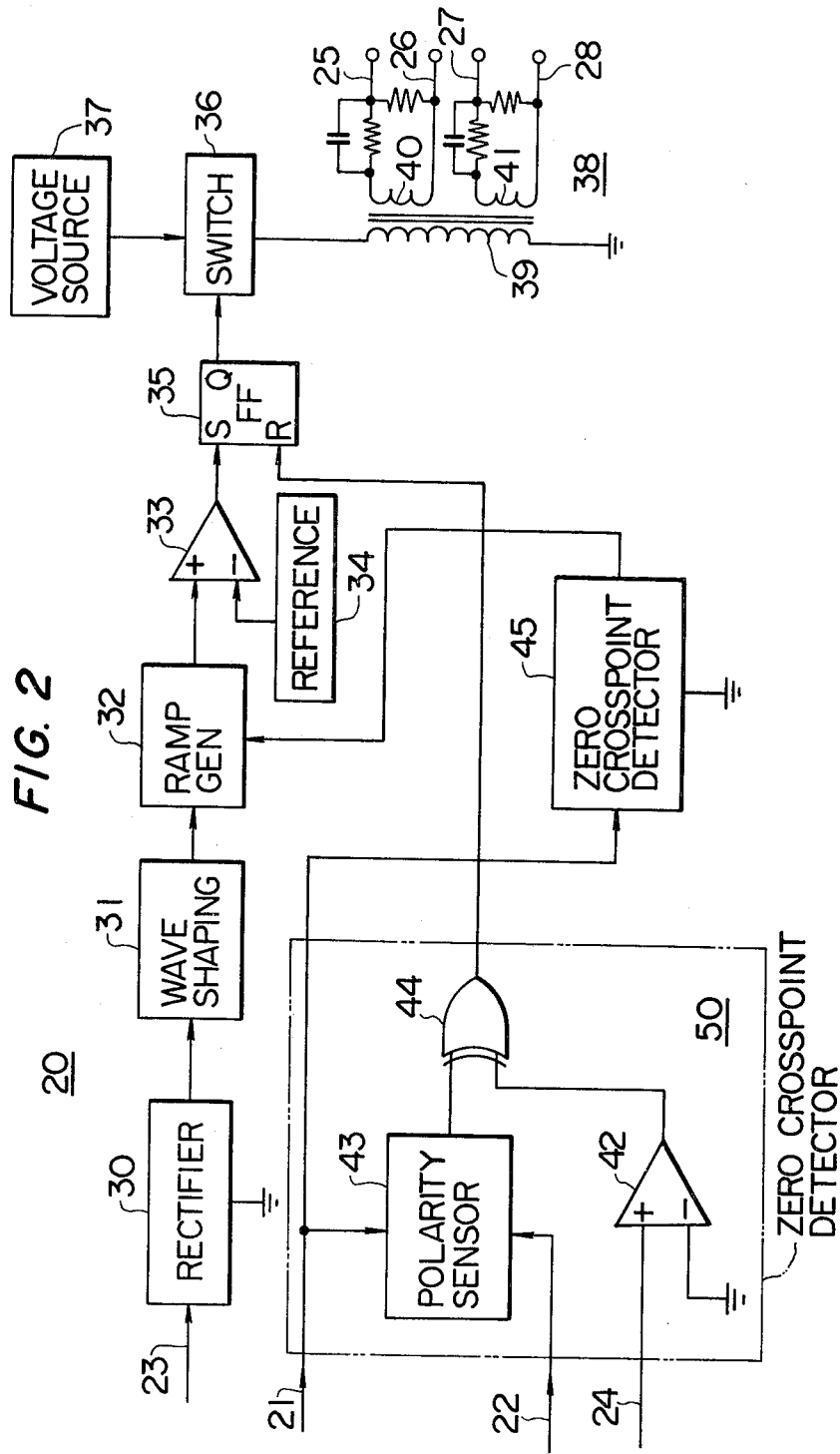
FIG. 2 is a block diagram of the gating control circuit of FIG. 1.

Details of the gating control circuit 20 are illustrated in FIG. 2. The control circuit 20 includes a rectifier 30 connected to conductor 23 to provide a rectified output of the potential at the anode of thyristor 11 which retains its polarity during each half-cycle of the low frequency input energy. The output from the rectifier 30 is shaped into rectangular pulses by means of a wave shaper 31 to serve as input energy for a storage circuit or ramp generator 32 which may be comprised of a capacitor in series with a resistor in a conventional integrator configuration to generate a linear ramp voltage in response to each input rectangular pulse. A comparator 33 compares the instantaneous voltage level of the ramp generator output with a reference voltage from a DC voltage source 34 to trigger a flip-flop 35 when the instantaneous level of the ramp voltage reaches the reference level. This results in a high voltage output from the flip-flop 35 which energizes a switching circuit 36 to apply a DC potential from a voltage source 37 to a pulse transformer 38 to produce a trigger current in the primary winding 39. Control pulses are induced in the secondary windings 40 and 41 of the transformer so that thyristors 11 and 12 are simultaneously supplied with gating pulses through conductors 25 to 28.

Figure 3:
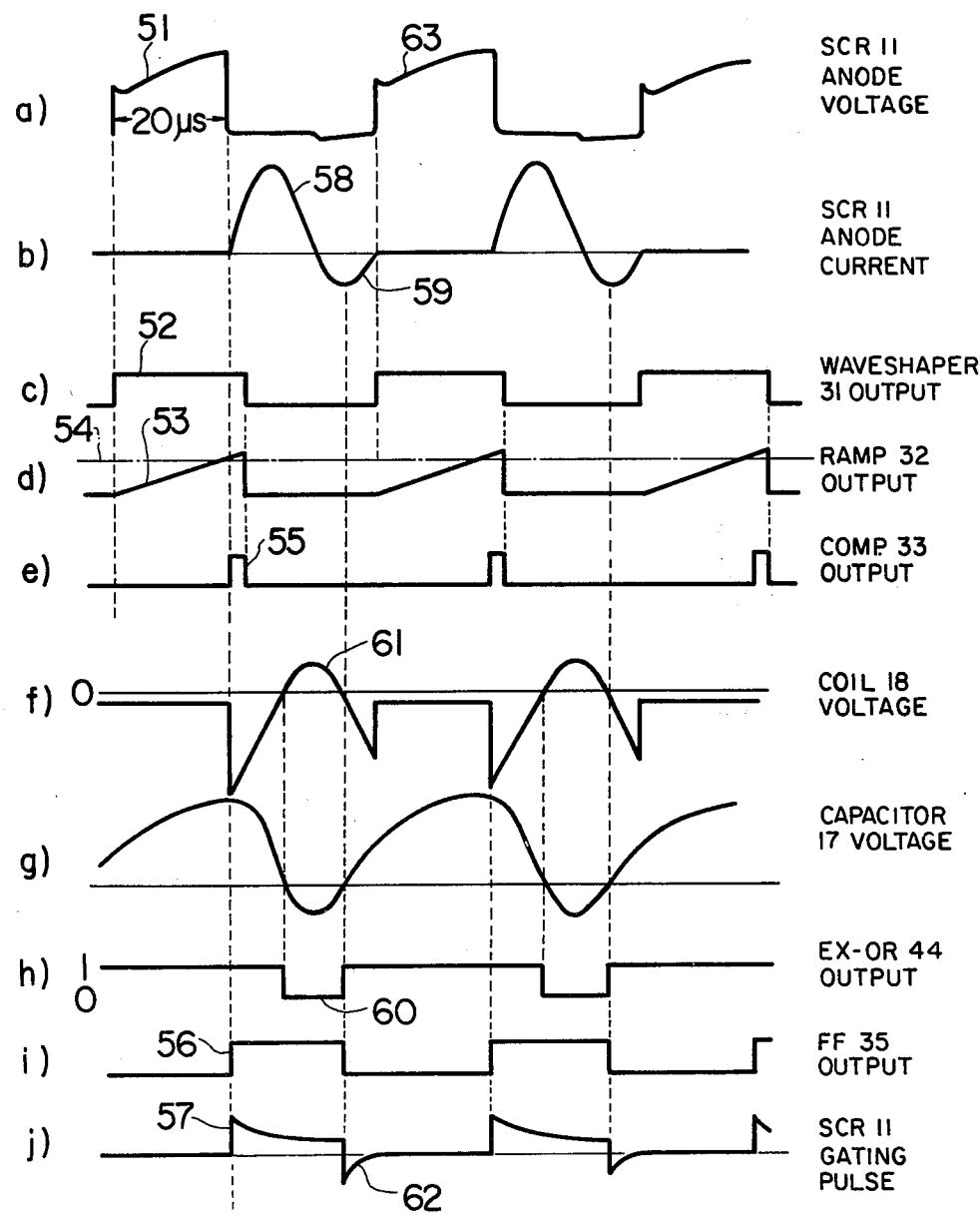
FIG. 3 is a graphic illustration of waveforms at various points of the circuits of FIGS. 1 and 2 useful for understanding the operation of the apparatus when the input power source has a positive polarity in its half-cycle.

Assuming for describing the operation of the apparatus that the potential at the power line 13 is positive with respect to the power line 14, the voltage at the anode of thyristor 11 has a positive polarity waveform as shown in FIG. 3a. In response to operation of the power switch 15, a positive voltage 51 at the anode of thyristor 11 is converted into a positive going pulse 52(FIG. 3c) which appears at the output of the waveshaper 31 to generate a ramp voltage 53(FIG. 3d). When the reference voltage as indicated by a chain-dot line 54 is reached, the comparator 33 generates an output pulse 55(FIG. 3e) which produces a pulse 56(FIG. 3i) at the Q output of flip-flop 35 and as a result positive gating control pulses 57(FIG. 3j) are produced in the secondary of the pulse transformer 38 as described above. Since the power line 13 is assumed to be positive, the thyristor 11 is rendered conductive in response to the control pulse 57, which results in the generation of a positive forward halfwave current 58(FIG. 3b) which lasts for a period smaller than the period of the gating pulse 57. Energy is stored in the commutating circuit which produces a backward negative halfwave current pulse 59 that commutates through the thyristor 12. When the thyristor 11 is turned on, the voltage at its anode as sensed by the rectifier 30 is dropped to a zero voltage level and rises again to the initial level at the end of the backward commutating current. Therefore, the pulse 57 serves to trigger a series of events as described above to repeat through the action of a feedback loop constituted by the aforesaid circuit elements.

The gating control pulse is switched off by resetting the flip-flop 35 when the magnitude of the backward commutating current reaches its maximum level. This is accomplished by detecting when a derivative of the backward commutating current reaches zero. The derivative of the backward current is obtained from the voltage across the work coil 18 or the voltage across the capacitor 17. In the present embodiment, the voltage across the work coil is detected by means of a comparator 42 of the zero crossing detector 50 to deliver a pulse whenever the input voltage is above the zero reference level. The zero crossing detector 50 further includes a polarity sensor 43 connected to receive potentials across the leads 21 and 22 to generate rectangular high and low level pulses depending on whether the polarity of the source voltage is positive or negative. The output signals from the comparator 42 and polarity sensor 43 are supplied to an Exclusive OR gate 44 to reverse the polarity of the output from the comparator 42 in the presence of the positive polarity of the input power source 10. During the positive half-cycle of the power source, the potential across the work coil 18 appears as indicated in FIG. 3f so that the comparator 42 generates a positive pulse when the input waveform is above the zero level, and this positive pulse is reversed in polarity by the Exclusive OR gate 44 to produce a pulse 60 as indicated in FIG. 3h whose trailing edge corresponds to the occurrence of the maximum value of the backward commutating current pulse 59.

The termination of the gating control pulse 57 results in the generation of negative going induced pulses 62 in the secondary windings of the transformer 38. These pulses are also supplied to the control gates of the thyristors in the same way as the gating control pulses are supplied, but for the purpose of negatively biasing the thyristor 11. This allows a rapid discharge of the residual carriers present in the semiconductive body of the thyristor 11 which has carried the forward current so that its turn-off time is reduced with the resultant increase in the dv/dt capability of the deice to the reapplication of an anode voltage at the beginning of the next firing operation. The reduced turn-off time serves to raise the upper frequency limit of the apparatus and provides an additional interval for commutation of backward current. The application of the negative bias to the control gate of the thyristor 12 which is now conducting has no effect thereon. However, the turn-off time of the thyristor 12 is also reduced since it is negatively biased by the reapplication of a voltage 63(FIG. 3a).

To assure safe operation of the apparatus, the control circuit 20 further includes a second zero crosspoint detector 45 which receives its input signal from the conductor 21 to detect the zero crossing point of the input power source for the purpose of providing a rapid discharge path to the storage capacitor of the ramp generator 32 in response to the occurrence of each zero crosspoint so that during a short interval of time at or near the zero voltage of the input power source the induction apparatus is prevented from initiating high frequency oscillation, whereby misfiring of the thyristors, which would otherwise occur during such periods, is avoided.

As an alternative source of information to determine the terminating point of the gating control pulses, it is also possible to use the voltage across the commutating capacitor 17 rather than the voltage across the work coil 18 since the voltage waveform across the capacitor 17 crosses the zero voltage level in synchronism with the voltage across the work coil 18 as illustrated in FIG. 3g.

Figure 4:
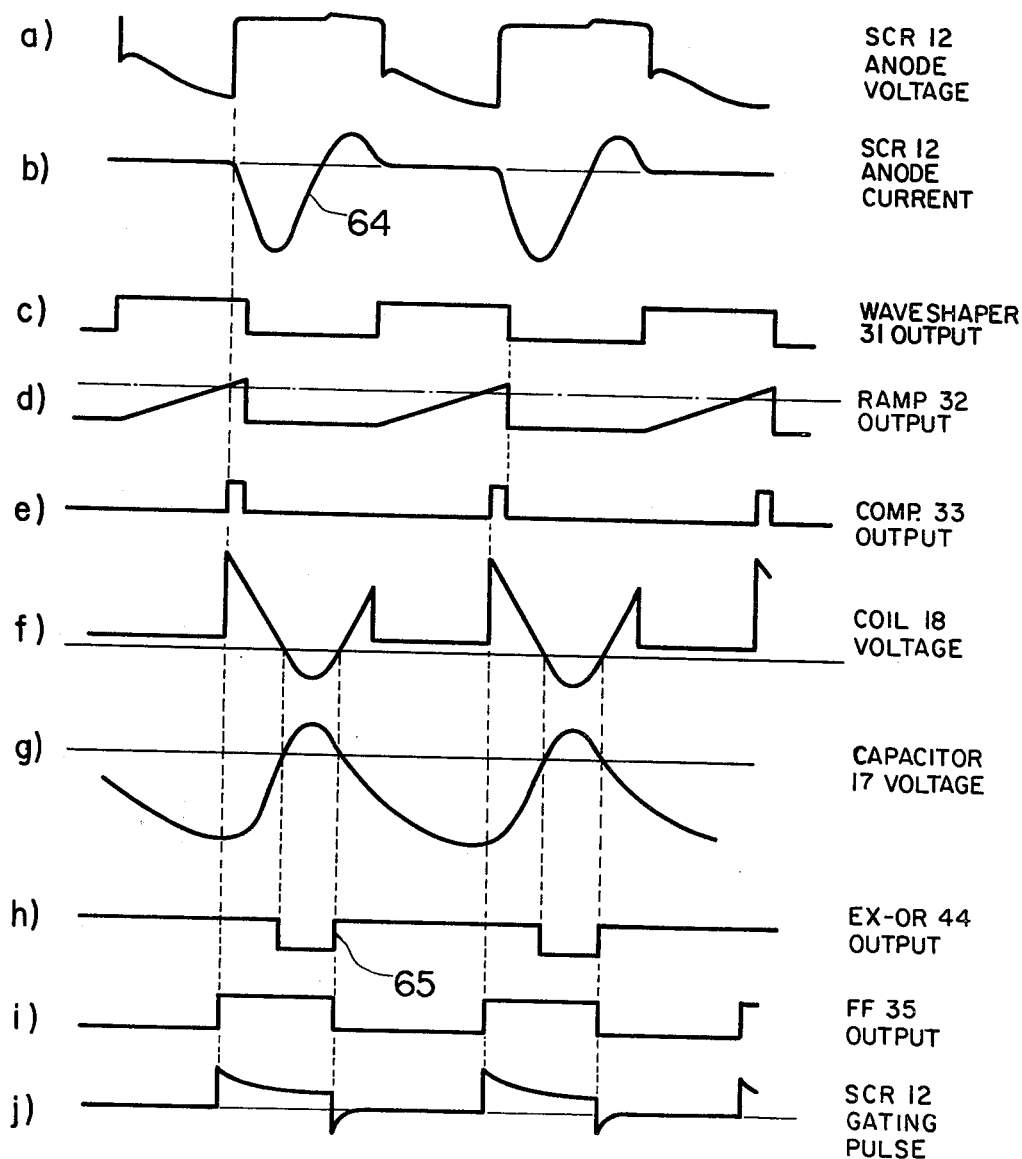
FIG. 4 is a graphic illustration similar to that of FIG. 3 useful for understanding the operation of the apparatus when the input power source has negative polarity in a subsequent half-cycle.

During the negative half cycle of the source voltage, that is, the voltage at power line 13 is negative with respect to the power line 14, the waveform of the voltage at the anode of thyristor 11 is reversed to appear as illustrated in FIG. 4a and the thyristor 12 is the first that conducts initially in the sequence of subsequent firing operations and produces a negative forward halfwave pulse 64(FIG. 4b). The waveform of the voltage across the work coil 18 is also reversed to appear as indicated in FIG. 4f and in this case the comparator 42 generates a negative going pulse in response to that voltage being below the zero voltage level, while the polarity sensor 43 delivers a negative output pulse to the Exclusive OR gate 44 so that the output from the latter is a negative pulse 65(FIG. 4h) comparable to the pulse 60 obtained during the positive half cycle of the power source. Therefore, the operation of the apparatus during the negative half cycle of the input power is analogous to that during the positive half cycle with the exception that the waveforms shown in FIGS. 3a, 3b, 3f, 3g are reversed as shown in the corresponding parts of FIGS. 4a, 4b, 4f and 4g.

With an increase in the magnitude of the inductive load the cycle of the forward current increases while the cycle of the backward commutating current decreases. The duration of the gating control pulse is varied accordingly to allow sufficient period to the reverse-biased thyristor to fire to carry backward commutating current even when load changes occur during operation of the apparatus. Therefore, commutation of backward current flow is always assured even when load changes occur. Since the commutation of current represents a negative power, which means that a certain amount of power is returned to the input power side of the apparatus, it is advantageous from the standpoint of power savings to control the length of the gating control pulses in accordance with the induction current as described above.

In a practical embodiment of the invention, the commutating circuit is tuned to a frequency above 20 kHz and this corresponds to a commutation interval of approximately 10 microseconds which must be greater than the reduced turn-off time of the thyristor due to the application of the negative bias potential. If the commutation interval is smaller than the reduced turn-off time of the thyristor which was conductive during the forward half-cycle would be fired again by the reapplication of an anode voltage at the end of the commutation. For 20 kHz operation, the minimum time period allowed for rendering the backwardly biased thyristor conductive is 5 to 6 microseconds. Since the maximum turn-on time of a thyristor is usually 3 microseconds, backward current commutation is always assured for other frequency operations even though load size varies in a wide range.

The function of the comparator 33 is for the purpose of establishing a constant interval between successive firing instanses such that the anode voltage of the forward current-carrying thyristor may rise to a sufficient level to cause it to conduct in subsequent firing operation.

The foregoing description shows only a preferred embodiment of the invention. Various modifications are apparent to those skilled in the art without deviating from the scope of the invention which is only defined in the appended claims.

What is claimed is:

1. An induction heating apparatus comprising a pair of gate-controlled switching devices each having a control electrode, first and second controlled electrodes connected in inverse parallel relationship to each other to receive power from a source of low frequency energy to generate a forward current flow in response to a gating control pulse applied to the control electrode of one of said switching devices with respect to its first controlled electrode depending on the polarity of said low frequency energy, a commutation circuit tuned to a high frequency in the ultrasonic range for generating a backward current flow which commutates through the other switching device in response to said forward current, a pulse transformer having a primary winding and a pair of secondary windings connected to the control electrode and the first controlled electrode of said switching devices respectively, first detecting means for detecting a rapid potential variation at the second controlled electrode of one of said switching devices, delay means for providing a delayed output signal after a preselected interval in response to said first detecting means, a second detecting means for detecting when the magnitude of said backward commutating current reaches a predetermined value, and a bistable device for supplying a gating control current to said primary winding of said transformer in response to said delayed output signal and terminating said gating control current in response to said second detecting means.

2. An induction heating apparatus as claimed in claim 1, wherein said second detecting means comprises means for detecting when a derivative of said backward current reaches zero.

3. An induction heating apparatus as claimed in claim 2, wherein said commutating circuit includes a capacitor and a work coil connected in series thereto, and said derivative detecting means comprises a zero crosspoint detector responsive to the potential across said work coil crossing a zero voltage level.

4. An induction heating apparatus as claimed in claim 3, wherein said derivative detecting means comprises a comparator connected to receive a signal representative of the derivative of said backward commutating current flow for comparison with a zero potential level to generate high and low voltage level pulses depending on whether said derivative is above or below said zero potential level, a polarity sensor for generating high and low voltage level pulses depending on the polarity of said low frequency energy, and an Exclusive OR gate receptive of said pulses at the outputs of said comparator and polarity sensor.

5. An induction heating apparatus as claimed in claim 1, wherein said first detecting means comprises a rectifier for generating a rectified output signal of the voltage at said second controlled electrode of said switching device.

6. An induction heating apparatus as claimed in claim 1, further comprising a zero crosspoint detector for providing an output when said low frequency energy is at or near zero voltage level to inhibit said gating control pulse.

* * * * *